United States Patent
Garry et al.

(10) Patent No.: US 8,658,938 B2
(45) Date of Patent: Feb. 25, 2014

(54) METHOD OF CUTTING WITH A LASER

(75) Inventors: Ian M. Garry, Thurcaston (GB); Michael N. Wybrow, Nottingham (GB)

(73) Assignee: Rolls-Royce PLC, London (GB)

( * ) Notice: Subject to any disclaimer, the term of this patent is extended or adjusted under 35 U.S.C. 154(b) by 1007 days.

(21) Appl. No.: 12/222,022

(22) Filed: Jul. 31, 2008

(65) Prior Publication Data

US 2009/0057279 A1 Mar. 5, 2009

(30) Foreign Application Priority Data

Aug. 31, 2007 (GB) .................................. 0716909.7

(51) Int. Cl.
*B23K 26/16* (2006.01)
*B23K 26/38* (2006.01)

(52) U.S. Cl.
USPC ................................. 219/121.72; 219/121.84

(58) Field of Classification Search
USPC ............................. 219/121.8, 121.84, 121.85, 219/121.63–121.72
See application file for complete search history.

(56) References Cited

U.S. PATENT DOCUMENTS

| | | | | |
|---|---|---|---|---|
| 3,742,182 A * | 6/1973 | Saunders | ................. | 219/121.71 |
| 4,644,128 A * | 2/1987 | Palentyn et al. | ......... | 219/121.67 |
| 5,149,937 A * | 9/1992 | Babel et al. | .............. | 219/121.68 |
| 5,223,692 A * | 6/1993 | Lozier et al. | ............ | 219/121.67 |
| 5,744,780 A * | 4/1998 | Chang et al. | ............. | 219/121.73 |
| 5,747,769 A * | 5/1998 | Rockstroh et al. | ....... | 219/121.71 |
| 6,128,546 A * | 10/2000 | Basista et al. | ................ | 700/166 |
| 6,211,485 B1 * | 4/2001 | Burgess | .................... | 219/121.7 |
| 6,420,677 B1 * | 7/2002 | Emer et al. | ................ | 219/121.71 |
| 6,676,878 B2 * | 1/2004 | O'Brien et al. | ................ | 264/400 |
| 2002/0104831 A1 * | 8/2002 | Chang et al. | ................ | 219/121.7 |
| 2002/0190435 A1 * | 12/2002 | O'Brien et al. | ............... | 264/400 |
| 2005/0230365 A1 | 10/2005 | Lei et al. | | |
| 2006/0169677 A1 * | 8/2006 | Deshi | ......................... | 219/121.7 |

FOREIGN PATENT DOCUMENTS

| | | | | |
|---|---|---|---|---|
| JP | 08187584 A | * | 7/1996 | |
| JP | 2007136471 A | * | 6/2007 | |
| WO | WO2004011186 A1 | * | 5/2004 | |

* cited by examiner

*Primary Examiner* — Samuel M Heinrich
(74) *Attorney, Agent, or Firm* — Oliff PLC

(57) ABSTRACT

A method of forming an aperture in an article includes directing a laser at the article and traversing the high energy beam to form a cut extending along the periphery of the aperture in a first direction to a second point on the periphery and then reversing the direction of cutting along the periphery till the aperture is formed.

22 Claims, 2 Drawing Sheets

METHOD OF CUTTING WITH A LASER

BACKGROUND

This invention relates to laser cutting articles and in particular laser cutting apertures in articles.

Apertures may be formed in sheet metal components using a laser. Where the aperture is larger than the beam diameter of the laser e.g. greater than 5 mm in diameter it is typical to traverse the laser over the component to cut a path that is equivalent to the desired edge profile of the aperture. As the laser traverses the profile to cut the metal by melting some of the material melted by the laser, the metal re-solidifies and forms a layer, typically called a recast layer. The recast layer can contain micro cracks and can be a weak point in the structure.

SUMMARY

Embodiments of the present invention provide an improved or enhanced method of cutting with a laser. According to a first aspect of the invention there is provided a method of forming an aperture in an article the aperture having a periphery, the method including the steps of directing a high energy beam at the article and traversing the high energy beam to form a cut extending to a first point on the periphery. The method further includes the step of cutting the article with the high energy beam along the periphery of the aperture in a first direction to a second point on the periphery and then reversing the direction of cutting along the periphery till the aperture is formed.

Preferably an assist gas is directed towards the article for removing material melted by the high energy beam. The high energy beam may be generated by a laser which is preferably a $CO_2$ laser.

Preferably the article is metallic and preferably in sheet form.

BRIEF DESCRIPTION OF THE DRAWINGS

Embodiments of the invention will now be described by way of example only, with reference to the accompanying drawings, in which.

DETAILED DESCRIPTION OF EMBODIMENTS

Figure 1:
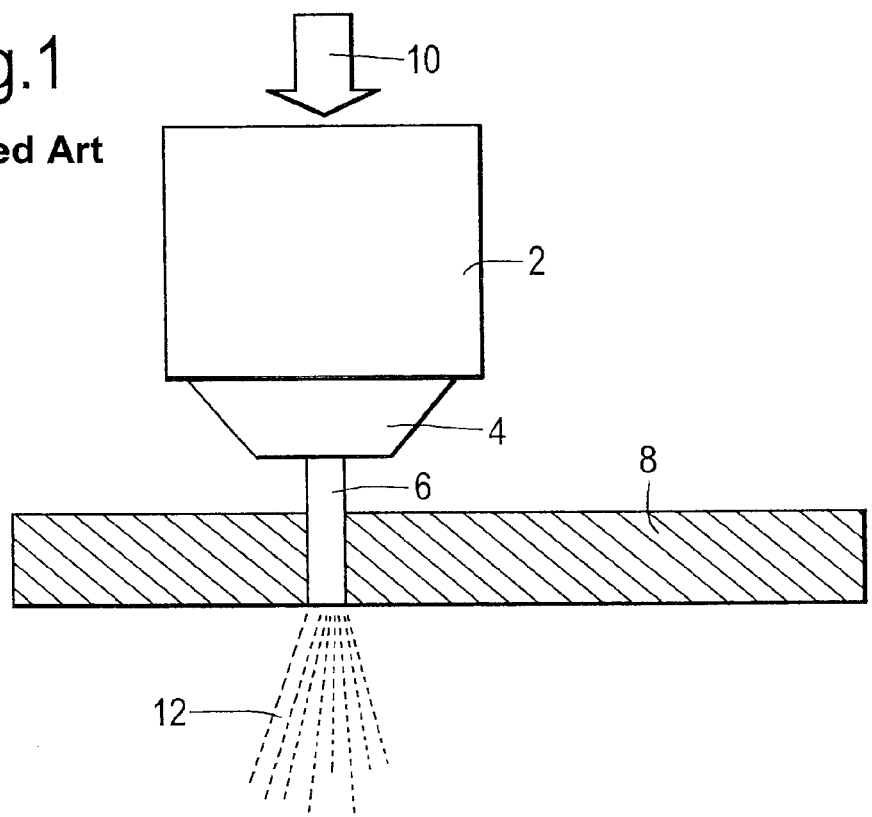
FIG. 1 depicts a laser cutting apparatus.

Laser cutting apparatus includes a laser head 2 having a nozzle 4 through which an assist gas and the laser beam 6 is directed towards the workpiece 8, which in the embodiment is a combustor casing formed of a nickel alloy such as C263 and Inco 718. Any appropriate laser may be used, the preferred laser being available from Trumpf under the model name TLC 1005.

The level of recast is kept low, in part, by the use of the process assist gas 10. The assist gas is usually an inert gas such as argon and is supplied through the laser nozzle in the direction of the laser beam. The gas entrains the molten material 12 formed from the cutting procedure and ejects it from the working location thereby preventing its resolidification on the workpiece.

Figure 2:
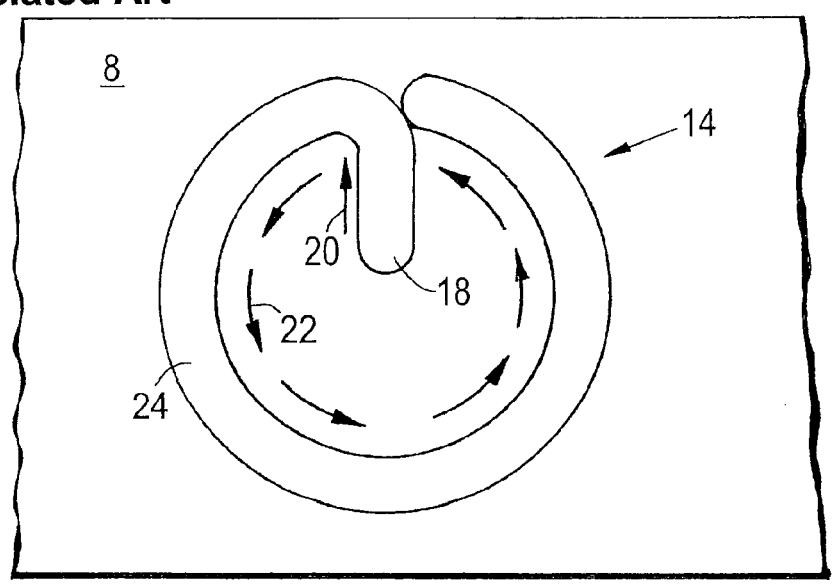
FIG. 2 depicts a known cut path when cutting an aperture with the laser of FIG. 1.

Apertures are cut in the workpiece by the laser following a predetermined path. A typical path 14 followed by a laser cutting a circular aperture is shown in FIG. 2. The central portion of the aperture 16 is rejected as swarf.

A pilot hole 18 is formed in the swarf blank and the laser is traversed radially in the direction of arrow 20 to the perimeter of hole which is to be formed. The laser then continues its traverse in one direction 22 around the profile of the aperture to be formed till the circuit is complete and the swarfed blank is removed.

The flow of the inert process gas remains constant throughout the cutting process. As mentioned above, the flow of gas assists in removing the melted metal from the cut location. The gas is not as focussed as the laser and therefore extends around the beam. Where the stream of gas impacts the workpiece it is reflected to create turbulence. At the point of cutting, or at a point where the workpiece has already been cut, the process gas flows through the cut 24 carrying entrained melted metal with it.

Since the laser traverses a linear path it will be understood that the process gas flow through the cut remains constant throughout the cutting process with the exception of cutting at the start of the process and at the end of the process. As the start of the cut occurs in a scrap portion of the workpiece the quality of the recast layer at this point is immaterial. However, the end of the cut occurs at the periphery of the aperture to be formed which means that the quality of the recast layer at this point is important.

It has been found that by following the standard method there is excessive recast at the end position. This is caused in part, it is believed, by a reduced gas pressure to entrain the molten material. Elsewhere along the cut the gas can flow through the workpiece only at the cutting location or through the cut that has just been made.

Figure 3:
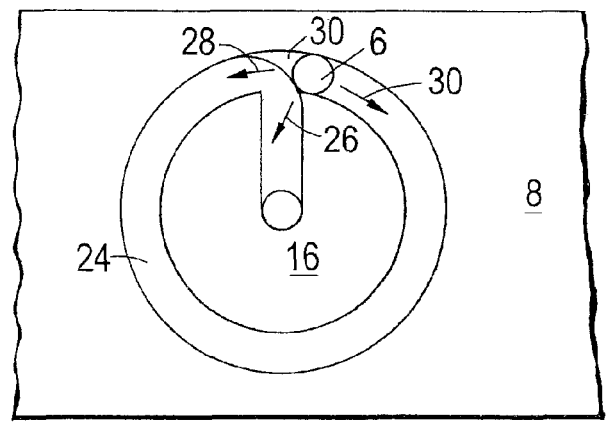
FIG. 3 depicts the position of the laser at breakthrough when following the laser path of FIG. 2.

FIG. 3 depicts the laser cutting at the point of breakthrough to complete the aperture after following the path of FIG. 2. The laser 6 continues to cut path 24 and as can be seen at the point of completion of the aperture the assist gas can pass through the workpiece in three directions, indicated by arrows. The first direction 26 is through the cut made to bring the laser from the centre of the swarf to the periphery of the aperture, the second direction 28 is through the cut in a direction forward of the laser in the traverse direction and the third direction 30 is through the cut in a direction rearward of the laser traverse direction.

The increased number of flow directions mean that there is less gas pressure to entrain the molten material away allowing a small pip of material 30 to melt back into the parent material forming an unacceptable recast layer that requires the workpiece to be dressed by hand or in another downstream process before desired metallurgical requirements are achieved. Simply increasing the flow of assist gas without altering the cut path, as will be described in due course, did not show significant improvement to the recast layer.

Figure 4:
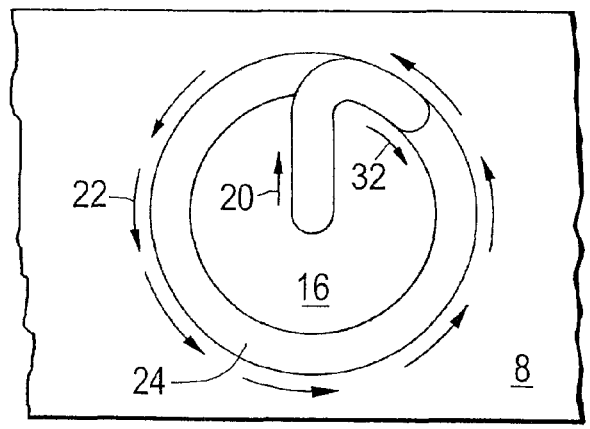
FIG. 4 depicts a cut path when cutting an aperture with the laser of FIG. 1 in accordance with the present invention.
Figure 5:
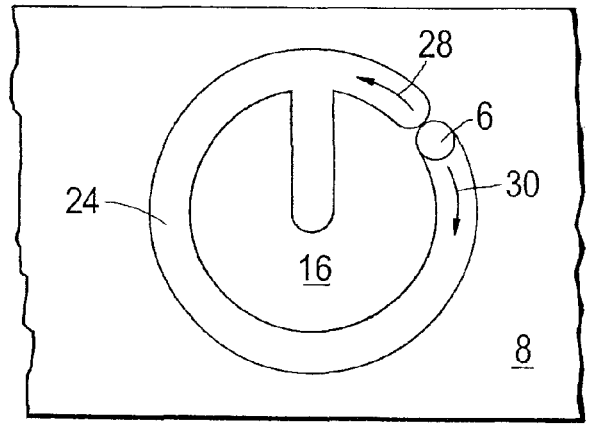
FIG. 5 depicts the position of the laser at breakthrough when following the laser path of FIG. 4.

In the embodiment of the invention as depicted in FIG. 4, the path of the laser is changed to reduce the recast layer. In this embodiment the pilot hole is formed in the swarf blank as before and the laser is traversed radially to the diameter of hole which is to be formed. The laser then begins a traverse 32 around the profile of the aperture till the rearward edge of the beam is past the traverse from the pilot to the profile edge 20. The laser traverse is then reversed and the profile cut by moving the laser in the opposite direction till the circuit is complete and the swarfed blank is removed.

By following the profile in the first direction till away from the traverse to the perimeter and then reversing the cut around the aperture profile the breakthrough point which completes the circuit is similarly moved away from the traverse from the pilot to the periphery. The assist gas no longer has a path through this cut meaning that the gas flow past the breakthrough point is maintained at a level high enough to entrain the molten material generated by the laser. An excessive recast at the breakthrough location is therefore avoided.

Whilst embodiments have been described with respect to a circular aperture, it will be appreciated that it is applicable to other more complex shaped apertures. It is preferable that the path of the laser is pre-programmed and controlled by a computer to achieve accurate cutting.

The embodiments are also applicable to other high energy beams such as Nd:YAG lasers or electron beams.

$CO_2$ laser cutting is a fast process for achieving sheet metal profiles. The embodiments enable apertures to be formed quickly and to specification without requiring a downstream operation to remove recast material.

The invention claimed is:

1. A method for forming an aperture in an article by a laser head having a nozzle that produces a process assist gas that is applied to a surface of the article, the aperture having a periphery, the method comprising:
   directing a high energy beam at the article in a swarf portion of the article;
   traversing the high energy beam to form a cut extending to a first point on the periphery; and
   cutting the article, in a single pass, with the high energy beam along the periphery of the aperture in a first direction to a second point on the periphery and then reversing the direction of cutting in substantially the opposite direction along the periphery until the aperture is formed, wherein
   the cutting path is configured to maintain a substantially uniform pressure of the process assist gas throughout the cutting of the article.

2. The method according to claim 1, wherein an assist gas is directed towards the article for removing material melted by the high energy beam.

3. The method according to claim 1, wherein the high energy beam is generated by a laser.

4. The method according to claim 3, wherein the high energy beam is generated by a $CO_2$ laser.

5. The method according to claim 1, wherein the article is metallic.

6. The method according to claim 5, wherein the article is in sheet form.

7. The method according to claim 1, wherein the cutting the article begins in a scrap portion of the article.

8. The method according to claim 1, wherein the cutting the article begins in a central portion of the article and is then traversed to the first point on the periphery.

9. A method for forming an aperture in an article by a laser head having a nozzle that produces a process assist gas that is applied to a surface of the article, the aperture having a periphery, the method comprising:
   directing a high energy beam at the article in a swarf portion of the article;
   traversing the high energy beam to form a cut extending to a first point on the periphery;
   traversing the high energy beam along the periphery to a second point on the periphery, cutting a region of the periphery in a single pass; and
   reversing the high energy beam in substantially the opposite direction along the periphery to the first point and cutting along the periphery until the aperture is formed, wherein
   the cutting path is configured to maintain a substantially uniform pressure of the process assist gas throughout the cutting of the article.

10. The method according to claim 9, wherein an assist gas is directed towards the article for removing material melted by the high energy beam.

11. The method according to claim 9, wherein the high energy beam is generated by a laser.

12. The method according to claim 9, wherein the cutting of the article begins in a scrap portion of the article.

13. The method according to claim 12, wherein the cutting of the article begins in a central portion of the aperture and is then traversed to a first point on the periphery.

14. A method for forming an aperture in an article, the article having a first surface and a second surface and a thickness between the first and second surfaces, the aperture having a periphery, the method comprising:
   directing a high energy beam at the first surface of the article and perforating the article such that the high energy beam penetrates through an entire thickness of the article;
   traversing the high energy beam to form a cut extending through the entire thickness of the article to a first point on the periphery;
   traversing the high energy beam along the periphery to a second point on the periphery and cutting through the entire thickness of the article in a single pass; and
   reversing the direction of cutting in substantially the opposite direction along the periphery, cutting through the entire thickness of the article in a single pass, until the aperture is formed.

15. The method according to claim 14, wherein an assist gas is directed towards the article for removing material melted by the high energy beam.

16. The method according to claim 14, wherein the high energy beam is generated by a laser.

17. The method according to claim 14, wherein the cutting of the article begins in a scrap portion of the article.

18. The method according to claim 14, wherein the cutting of the article begins in a central portion of the aperture and is then traversed to a first point on the periphery.

19. The method according to claim 1, wherein the high energy beam penetrates through the article as the cut is being formed.

20. The method according to claim 9, wherein the high energy beam penetrates through the article as the cut is being formed.

21. The method according to claim 14, wherein in the reversed direction between the second point on the periphery and the first point on the periphery, the high energy beam penetrates through the entire thickness of the article.

22. The method according to claim 14, wherein the cutting of the article starts at a position spaced from the periphery of the aperture.

* * * * *